United States Patent

Martin et al.

[11] 3,864,395
[45] Feb. 4, 1975

[54] PHENYL UREAS, THEIR USE AS SELECTIVE HERBICIDES

[75] Inventors: Henry Martin, Basel; Otto Rohr, Therwil; Dieter Duerr, Bottmingen; Stefan Janiak, Basel, all of Switzerland; Georg Pissiotas, Loerrach, Germany; Werner Toepfl, Basel, Switzerland

[73] Assignee: Ciba-Geigy AG, Basel, Switzerland

[22] Filed: Oct. 8, 1971

[21] Appl. No.: 187,831

Related U.S. Application Data

[63] Continuation-in-part of Ser. No. 816,375, April 15, 1969, abandoned.

[52] U.S. Cl...... 260/553 A, 260/552 R, 260/453 A, 71/120
[51] Int. Cl............................................ C07c 127/18
[58] Field of Search................................. 260/553 A

[56] References Cited
UNITED STATES PATENTS
3,326,663   6/1967   Soloway et al............. 260/553 A X
FOREIGN PATENTS OR APPLICATIONS
2,006,525   12/1969   France
1,501,293   11/1966   France............................ 260/553 A

*Primary Examiner*—Leon Zitver
*Assistant Examiner*—Michael W. Glynn
*Attorney, Agent, or Firm*—Harry Falber; Frederick H. Rabin

[57] ABSTRACT

Compounds of the formula

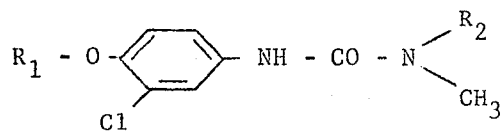

wherein $R_1$ is an alkoxyalkyl or alkylthio alkyl radical and
  $R_2$ is hydrogen, a lower alkyl or lower alkenyl radical, herbicidal compositions containing them and their use as selective herbicides are described.

2 Claims, No Drawings

PHENYL UREAS, THEIR USE AS SELECTIVE HERBICIDES

CROSS REFERENCE

This is a continuation-in-part of our application Ser. No. 816,375 filed Apr. 15, 1969, now abandoned.

The present application relates to compounds of formula

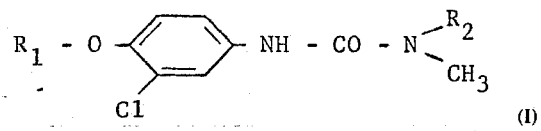

(I)

wherein $R_1$ is a lower alkoxy-lower-alkyl
or a lower alkylthio-lower alkyl group with up to 1–4 carbon atoms per alkyl moiety,
$R_2$ is hydrogen, a lower alkyl or lower alkenyl with up to 4 carbon atoms in the radical.

The term "lower" alkyl or alkoxy or alkylthio groups, as applied to the substituent $R_1$ means those groups which possess 1 to 4, preferably 1 or 2, carbon atoms and which may have straight or branched chains, for example, methyl, ethyl, propyl, isopropyl, butyl, isobutyl, sec. butyl or tert. butyl.

The lower alkyl groups which are possible for $R_2$ may possess 1 to 4 carbon atoms, but preferably contain only 1 or 2 carbon atoms. The lower alkenyl groups which $R_2$ can represent possess 2 to 4 carbon atoms. Alkenyl groups especially preferred are those possessing 3 or 4 carbon atoms; the methallyl or 2-methylpropenyl (1) residue may be mentioned as examples.

The manufacture of these compounds is carried out according to methods which are in themselves known, for example by reaction of a compound of formula

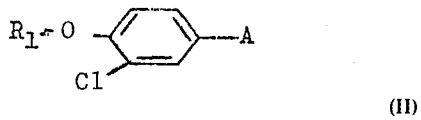

(II)

with a compound of formula

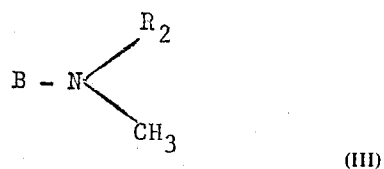

(III)

wherein $R_1$ and $R_2$ have the significance indicated above, and A and B denote residues which can form ureas by addition or condensation. In the present process, one of the two groups A and B represents an amine, whilst the other represents a urethane, a carbamoyl halide, a urea group or especially an isocyanate or isothiocyanate group. In the latter case, it is necessary to carry out a post-treatment with an oxidising agent, for example, HgO, $Cl_2/H_2O$ or $COCl_2/H_2O$, in order to replace the S atom by oxygen. If $R_2$ represents hydrogen another substituent $R_2$ may be introduced by appropriate posttreatment, for example by alkylation or alkenylation. If $R_2$ is intended to represent the 2-methylpropenyl-(1) group, then as suitable starting materials, there may be mentioned especially the corresponding phenylisocyanate on the one hand and, as the amine, isobutylidene-N-methylamine on the other.

The working conditions used are those usually employed for the formation of urea from isocyanate and amine, with the desired N-methyl-N-2-methylpropenyl(1)-urea being produced in one process stage through displacement of the double bond.

The compounds of formula (I) possess pronounced selective herbicidal properties and are especially advantageous for combating weeds in culture plants, especially in cultures of grain, maize, cotton and legumes. The term "grain" is used herein to mean especially wheat, barley and rye, the term "legumes" means especially soya. The action is not restricted to broad-leaved weeds, but also manifests itself to the same degree in the case of grass-like weeds. The use of a sufficiently large amount results in total herbicidal effect. The active substances can be used both in the pre-emergence and also in the post-emergence process. The amounts used can vary within wide limits, for example, within the range of from 0.1 to 10 kg of active substance per hectare, but preferably 0.5 to 5 kg of active substance per hectare are employed.

Compounds of formula I with especially advantageous selective properties have the methoxy-methylmethoxy ethyl, methylthio-methoxy or ethylthio radicals as $R_1$ and hydrogen or the methyl group as substituent $R_2$.

The present invention also provides a herbicidal preparation, which comprises, as active ingredient, a compound of the general formula (I) together with a suitable carrier. Other additives may also be present. Suitable carriers and additives may be solid or liquid, and are substances which are usually used in formulation technology for example natural or regenerated mineral substances, solvents, diluents, dispersing agents, emulsifiers, wetting agents, adhesives, thickeners, binders or fertilisers. Furthermore, other herbicides may also be added. Such herbicides can, for example, belong to the class of the ureas, the saturated or unsaturated halogen-fatty acids, halogenobenzonitriles, halogenobenzoic acids, phenoxyalkylcarboxylic acids, carbamates, triazines, nitroalkylphenols, quaternary ammonium salts, sulphamic acid, arsenates, arsenites, borates or chlorates.

When used in pesticides, the compounds of formula (I) may be processed as dusting agents, emulsion concentrates, granules, dispersions or as sprays, for example for gas phase application in greenhouses, as solutions or suspensions of the usual formulation, which is part of the general knowledge of application technology. Compare the relevant data in U.S. Pat. No. 3,329,702 or British Patent 1,047,644 or Swiss Patent 424,359.

The following Examples illustrate the invention.

EXAMPLE 1

A solution of 22.8 g of 3-chloro-4-($\beta$-methoxy)-ethoxyphenyl-isocyanate in 100 ml of dry acetonitrile is added drop by drop to a solution of 15 ml of 40 % strength dimethylamine in 100 ml of water at room temperature, while stirring vigorously. After completion of the addition, the solution is further stirred for about 4 hours, after which the N-[3-chloro-4-($\beta$-methoxy)-ethoxyphenyl)-N',N'-dimethyl-urea of formula

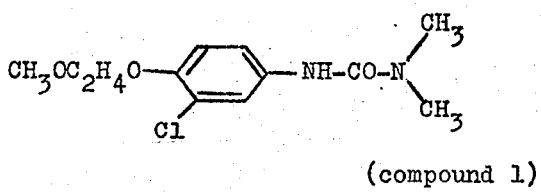

(compound 1)

which has crystallised out is filtered off. Yield: 26.2 g = 96 %. After recrystallisation from a benzene/petrol mixture, the melting point is about 94°–95°C.

The following compounds were manufactured analogously:

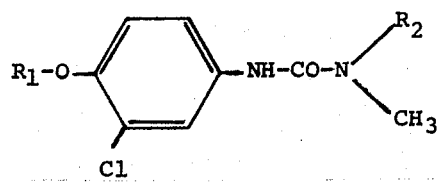

| Compound No. | $R_1$ | $R_2$ | Melting point in °C |
| --- | --- | --- | --- |
| 2 | $CH_3OCH_2-$ | $CH_3$ | 129 – 130 |
| 3 | $C_2H_5OC_2H_4-$ | $CH_3$ | 110 – 111 |
| 4 | $CH_3SC_2H_4-$ | $CH_3$ | 100 – 101 |
| 5 | $CH_3OCH_2-$ | H | 143 – 144 |
| 6 | $CH_3OC_2H_4-$ | H | 126 – 127 |
| 7 | $C_2H_5OC_2H_4-$ | H | 141 – 142 |
| 8 | $C_2H_5OCH_2-$ | H | 135 – 136 |
| 9 | $CH_3SCH_2-$ | H | 136 – 137 |
| 10 | $CH_3SC_2H_4-$ | H | 108 – 110 |
| 11 | $C_2H_5SC_2H_4-$ | H | 136 – 138 |
| 12 | $CH_3OC_2H_4-$ | $CH_3$ | 58 – 60 |
| 13 | $C_2H_5OC_2H_4-$ | $CH_3$ | boiling point 192°C/0.001mm |
| 14 | $n-C_4H_9OC_2H_4-$ | $CH_3$ | 40 – 42 |
| 15 | $CH_3SCH_2-$ | $CH_3$ | 74 – 76 |
| 16 | $C_2H_5SC_2H_4-$ | $CH_3$ | 74 – 76 |

EXAMPLES OF FORMULATIONS

Dusting agents

Equal parts of an active substance according to the invention and precipitated silica are finely ground together. Dusting agents, which preferably contain 1 – 6 % of active substance, can be manufactured therefrom by mixing with kaolin or talc.

Spraying powders

In order to manufacture a spraying powder, the following compounds are, for example, mixed and finely ground:

50 parts of active substance according to the present invention
20 parts of "Hisil" (highly adsorbent silica)
20 parts of bolus alba (kaolin)
3.5 parts of a reaction product of p-tert. octylphenol and ethylene oxide, and
1.5 parts of sodium 1-benzyl-2-stearyl-benzimidazole-6,3'-disulphonate.

Emulsion concentrate

Easily soluble active substances can also be formulated as an emulsion concentrate in accordance with the following instruction:

20 parts of active substance
70 parts of xylene, and
10 parts of a mixture of a reaction product of an alkylphenol with ethylene oxide and calcium dodecylbenzenesulphonate are mixed. On dilution with water to the desired concentration, a sprayable emulsion is produced.

EXAMPLE 2

The plants quoted in the Table below were sown in a greenhouse. The test was carried out with compounds 1 and 3 in the post-emergence process 12 days after sowing. The assessment was carried out 18 days after application.

| Plant | 2 kg of active substance per hectare | | 1 kg of active substance per hectare |
| --- | --- | --- | --- |
| | 1 | 3 | 1 |
| Zea | 2 | 3 | 2 |
| Digitaria | 9 | 9 | 7 |
| Panicum | 6 | — | — |
| Poa | 7 | 6 | — |
| Alopecurus | 6 | — | — |
| Galium | 8 | 7 | 7 |
| Calendula | 9 | 9 | 9 |
| Chrysanthemum | 9 | 9 | 9 |
| Brassica | 9 | 9 | 9 |
| Ipomoea | 9 | 9 | 9 |
| Stellaria | 8 | 8 | 8 |
| Amaranthus | 9 | 9 | 9 |

Code:
1 = no damage
3 = damage which can still just be tolerated
9 = total damage

EXAMPLE 3

The compounds Nos. 2 and 5 were compared in pre and post-emergence application with the compounds A   N-(3-chloro-4-ethoxyphenyl)-N'-methyl-N'-n-butyl urea B   N-(3-chloro-4-ethoxyphenyl)-N',N'-dimethyl urea, both known from the French Patent No. 1,501,293.

As testing liquor a 1% sprayable dispersion obtained from the following composition by dilution with water was used.

50 % of one of the compounds No. 2, 5, A or B,
33.5 % of Bolus alba (kaolin),
11 % of the ammonium salt of ligninsulfonic acid,
4.5 % of sodium dinaphthylmethanedissulfonate (a product commercially available under the tradename "Neradol"),
1 % of a mixture of 40 parts of alkylarylpolyethyl alcohol and 60 parts of magnesium carbonate (a product commercially available under the tradename "Triton X 120").

Pre-Emergence Application:

The plant seeds were sown in a series of earthenware pots in a greenhouse. One day after sowing the pots were sprayed with the testing liquor. The amount of spraying liquor corresponded to 1 respectively 2 kg of active substance per hectare. Evaluation took place 20 days after sowing.

Post-Emergence Application:

The plants were sown into trays filled with earth in a greenhouse. When they had reached the 2 to 3 leaf stage, about 12 days after seeding they were sprayed with the testing liquor so that the final amount of active substance applied corresponded to 1 respectively 2 kg per hectare. The assessment of the test was made out 18 days after the treatment and the plants were evaluated according to the following key:

1 – 2 plant not or only slightly damaged

3 – 5 medium but recoverable damage to plants
6 – 8 heavy damage
9 plant killed

The results are summarized in the table below.

Table

| Compound tested in pre- and post-emergence application, concentration in kg/ha | No. 2 | | | | No. 5 | | A | | | | B | | | |
|---|---|---|---|---|---|---|---|---|---|---|---|---|---|---|
| | pre | | post | | pre | post | pre | | post | | pre | | post | |
| | 2 | 1 | 2 | 1 | 2 | 2 | 2 | 1 | 2 | 1 | 2 | 1 | 2 | 1 |
| Triticum | 2 | 1 | 3 | 2 | 2 | 1 | 6 | 3 | 4 | 3 | 4 | 2 | 3 | 2 |
| Hordeum | 7 | 5 | 4 | 3 | 2 | 2 | 4 | 3 | 4 | 3 | 4 | 3 | 4 | 3 |
| Avena | 9 | 9 | 9 | 8 | 5 | 3 | 9 | 9 | 8 | 7 | 6 | 1 | 5 | 4 |
| Zea | 5 | 5 | 3 | 2 | 3 | 1 | 4 | 2 | 4 | 4 | 1 | 1 | 4 | 4 |
| Oryza | 6 | 5 | 9 | 8 | 6 | 4 | 5 | 4 | 5 | 5 | 3 | 1 | 5 | 4 |
| Digitaria | 9 | 9 | 9 | 8 | 9 | 4 | 9 | 9 | 9 | 9 | 9 | 9 | 9 | 9 |
| Sorghum | 6 | 4 | 7 | 7 | 3 | 2 | 7 | 5 | 8 | 6 | 1 | 1 | 4 | 3 |
| Panicum | 6 | 3 | 9 | 9 | 4 | 3 | 5 | 4 | 7 | 6 | 7 | 1 | 5 | 3 |
| Poa | 9 | 9 | 9 | 5 | 5 | 4 | 9 | 9 | 9 | 9 | 6 | 3 | 8 | 5 |
| Alopecurus | 8 | 8 | 9 | 5 | 7 | 4 | 7 | 6 | 9 | 9 | 6 | 3 | 6 | 4 |
| Beta | 9 | 9 | 9 | 7 | 9 | 7 | 9 | 9 | 9 | 9 | 2 | 1 | 9 | 9 |
| Galium | 3 | 3 | 9 | 5 | 3 | 5 | 7 | 6 | 9 | 7 | 2 | 1 | 4 | 4 |
| Calendula | 9 | 9 | 9 | 9 | 9 | 9 | 9 | 8 | 9 | 9 | 8 | 3 | 9 | 9 |
| Chrysanthemum | 9 | 9 | 9 | 9 | 9 | 9 | 9 | 9 | 9 | 9 | 4 | 1 | 9 | 5 |
| Linum | 9 | 9 | 9 | 5 | 9 | 9 | 6 | 4 | 9 | 9 | 2 | 1 | 9 | 9 |
| Brassica | 9 | 9 | 9 | 8 | 9 | 9 | 9 | 9 | 9 | 9 | 7 | 6 | 9 | 9 |
| Ipomoea | 9 | 9 | 9 | 9 | 9 | 9 | 9 | 9 | 9 | 9 | 7 | 4 | 9 | 5 |
| Stellaria | 9 | 9 | 9 | 9 | 9 | 9 | 9 | 9 | 9 | 9 | 9 | 9 | 9 | 9 |
| Soja | 9 | 9 | 9 | 9 | 5 | 4 | 5 | 4 | 9 | 9 | 2 | 1 | 9 | 9 |
| Gossypium | 7 | 3 | 7 | 4 | 1 | 3 | 6 | 5 | 8 | 8 | 1 | 1 | 9 | 9 |
| Amaranthus | 9 | 9 | 9 | 9 | 9 | 5 | 9 | 9 | 9 | 9 | 9 | 9 | 9 | 9 |

In these tests compounds No. 2 and 5 show excellent selective herbicidal activity in pre- and post-emergence application towards wheat, and in post-emergence application towards maize, which are not attained by compounds A and B.

We claim:
1. N-(3-chloro-4-methoxymethoxyphenyl)-N',N'-dimethyl urea.
2. N-(3-chloro-4-ethoxyethoxyphenyl)-N',N'-dimethyl urea.

* * * * *

UNITED STATES PATENT OFFICE
CERTIFICATE OF CORRECTION

PATENT NO. : 3,864,395

DATED : February 4, 1975

INVENTOR(S) : Henry Martin, Otto Rohr, Dieter Duerr, Stefan Janiak, Georg Pissiotas, Werner Toepfl It is certified that error appears in the above—identified patent and that said Letters Patent are hereby corrected as shown below:

The following should be inserted in the heading:

Foreign Application Priority Data

April 19, 1968  Switzerland..................5829/68

Signed and Sealed this twentieth Day of January 1976

[SEAL]

Attest:

RUTH C. MASON
*Attesting Officer*

C. MARSHALL DANN
*Commissioner of Patents and Trademarks*